United States Patent [19]
Htoo et al.

[11] 3,831,905
[45] Aug. 27, 1974

[54] AGITATED REACTOR FOR PROCESSING SEMICONDUCTOR SUBSTRATES

[75] Inventors: Maung S. Htoo, Poughkeepsie; Claude G. Metreaud, Fishkill; Herman F. Schmitt, Wappingers Falls, all of N.Y.

[73] Assignee: International Business Machines Corporation, Armonk, N.Y.

[22] Filed: Dec. 29, 1972

[21] Appl. No.: 319,597

[52] U.S. Cl. ......................... 259/4, 259/95, 417/478
[51] Int. Cl. ......... B01f 5/06, B01f 5/12, B01f 15/02
[58] Field of Search ..................... 259/4, 18, 36, 95; 417/478

[56] References Cited

UNITED STATES PATENTS

| | | | |
|---|---|---|---|
| 1,369,686 | 2/1921 | Martel | 259/95 |
| 2,386,419 | 10/1945 | Auer | 259/95 |

FOREIGN PATENTS OR APPLICATIONS

| | | | |
|---|---|---|---|
| 1,001,208 | 8/1965 | Great Britain | 417/478 |

*Primary Examiner*—Peter Feldman
*Assistant Examiner*—Alan Cantor
*Attorney, Agent, or Firm*—Henry Powers

[57] ABSTRACT

An agitated liquid reactor whose fluid is recirculated from an outlet through a porous wall structure. Recirculation is effected through a conduit having a flexible conduit portion which is periodically compressed toward the porous wall structure.

1 Claim, 1 Drawing Figure

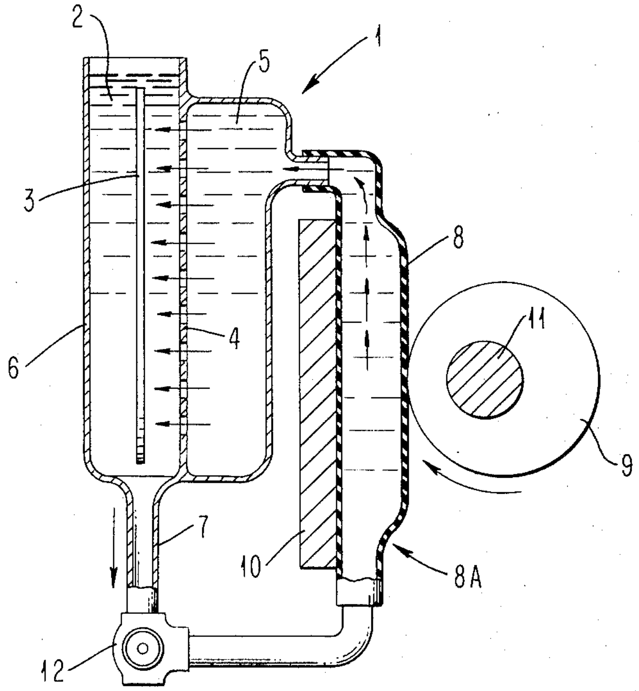
2
1
5
3
8
4
11
6
9
7
10
8A
12

AGITATED REACTOR FOR PROCESSING SEMICONDUCTOR SUBSTRATES

FIELD OF THE INVENTION

This invention is directed to reactor vessels and more particularly to apparatus for agitation of fluids for processing of semiconductor substrates in such vessels.

The efficiency of a reaction between diverse materials depends on the availability of intimate contact between a solid and a liquid, the portions of the liquid, adjacent to the solid, become depleted of reactant and are exchanged with the reaction product. Such condition retards further reaction which can inordinately prolong completion of the reaction. A conventional approach, in extensive use, is the application of agitation to achieve a continuous replenishment of reactive fluid adjacent to the solid.

SUMMARY OF THE INVENTION

In accordance with this invention, efficient agitation of liquids in various vessels or containers is obtained by a novel structure characterized by simplicity of design. Structurally, the unit comprises a reactor or container provided with a porous wall structure through which the liquid is circulated from an outlet or drain of the container. In the preferred form, the external chamber is supplied from the container outlet or drain. In one form, the container outlet and plenum chamber are interconnected by a conduit having a flexible portion which is periodically compressed toward the plenum chamber.

The foregiong and other objects, features, and advantages of the invention will be more apparent from the following more particular description of the preferred embodiments of the invention as illustrated in the accompanying drawing.

BRIEF DESCRIPTION OF THE DRAWINGS

The FIGURE is an elevational view, in section, of one embodiment of this invention illustrating its application to the processing of semiconductor wafers.

DESCRIPTION OF THE PREFERRED EMBODIMENTS

As shown in the drawing, the invention comprehends a processing tank or vessel 1 adapted to contain a liquid reactant 2 to be employed for processing a solid 3. Illustratively, the processing may comprise photolithographic development of masking on semiconductor substrate from a layer of photoresist material, which has been exposed in a pattern required to define the desired mask. In such application, the solid 3 will comprise a 0.015 inch thick semiconductor wafer of about 2.25 diameter suitably coated with a resist composition exposed in a pattern to define a required opening pattern, e.g., an etchant mask for forming diffusion windows in an underlying layer of silicon dioxide formed on the wafer.

For development of the exposed photoresist, the liquid reactant 2 can comprise a solvent for differentially solvating the exposed and unexposed portions of the resist coating. For positive photoresist coatings, the exposed portion will be removed to retain a complementary pattern of the unexposed portions; and conversely, for negative photoresist compositions, the unexposed portions will be removed to retain a complementary pattern of the exposed portions. After development, a like tank unit can be employed containing an etchant for forming diffusion windows or openings in the underlying silicon dioxide coating, with subsequent use of an additional tank unit containing a solvent for stripping of remaining portions of the photoresist coating. In all units, the liquid 2 is agitated in accordance with this invention in order to obtain intimate contact between the liquid 2 and the foregiong surfaces of the substrate units 3 for rapid and complete processing thereof.

To this end, the processing tank 1 is provided with a porous or perforated side wall structure 4 whose external surface is enclosed within a plenum chamber 5. For purposes of processing the aforeindicated 2.25 inch diameter wafers, the spacing between the vertical walls 4 and 6 will be approximately 0.5 inches with the tank 1 having a depth and an extension (normal to the plane of the drawings) of about 3 inches.

Interconnecting the tank outlet or drain 7 with the plenum chamber 5 is a conduit 8A having an enlarged, flexible portion 8 disposed between an eccentric cam 9 and an anvil or solid base 10. The cam 9 is mounted on a suitable driven shaft 11 arranged, on rotation, to permit the eccentric cam 9 to pinch the flexible conduit portion 8 against anvil 10 to trap the liquid and propel it toward plenum chamber 5 as the cam 9 rotates through its effective arc to progressively compress the flexible conduit portion ahead of it.

As cam 9 rotates the portions of conduit 8 behind, it will be replenished with the liquid tank 1 whose flow can be controlled by a valve 12, which can be adjusted to insure less flow resistance through conduit 8 than the resistance of any backflow through the porous wall unit 4.

In operation, a solid 3 in the form of the above noted semiconductor wafer will be submerged in a vertical position within the liquid reactant 2, with the working or faying surface of the wafer facing the porous wall membrane 4. With each revolution of shaft 11, the cam 9 will periodically compress the flexible conduit portion 8 toward the anvil 10 to inject into the plenum chamber 5 corresponding portions of the liquid reactant 2 which in turn will be forced through the porous wall membrane 4 into the interior of tank 1 with uniform pulsed distribution across the working face of the wafer. The amplitude of the pulsed agitation of the liquid resistance 2 can be readily determined by the ratio of the fluid volume in the compressed portion of the conduit portion 8 to that of the processing tank 1. The rate of the pulsed agitation can be readily controlled by appropriate design of cam 9 and also by the motor speed driving shaft 11.

While the invention has been particularly shown and described with reference to a preferred embodiment thereof and applications therefore, it will be understood by those skilled in the art that various changes in form and details may be made therein and the invention employed for various applications without departing from the spirit and scope of the invention.

What is claimed is:

1. A processing vessel comprising a vertical container adapted to contain a liquid having a pair of side walls in close proximity to each other with at least one of said side walls comprising a porous member and means for injections of a fluid transverse to the porous side wall and through said member under pressures to agitate said liquid in said container;

a plenum chamber adjacent to and enclosing the external surface of said member in cooperative relationship to said injection means;

a conduit between the bottom of said container below the level of said liquid therein and said plenum chamber for circulating said liquid therein;

wherein a portion of said conduit comprises a resilient portion, and said injection means comprises means for periodically compressing said resilient portion.

* * * * *

UNITED STATES PATENT OFFICE
CERTIFICATE OF CORRECTION

Patent No. 3,831,905 Dated August 27, 1974

Inventor(s) Maung S. Htoo et al.

It is certified that error appears in the above-identified patent and that said Letters Patent are hereby corrected as shown below:

On the cover sheet [75] insert -- Robert V. Schneider, Mahopac --.

Signed and sealed this 12th day of November 1974.

(SEAL)
Attest:

McCOY M. GIBSON JR.
Attesting Officer

C. MARSHALL DANN
Commissioner of Patents